UNITED STATES PATENT OFFICE.

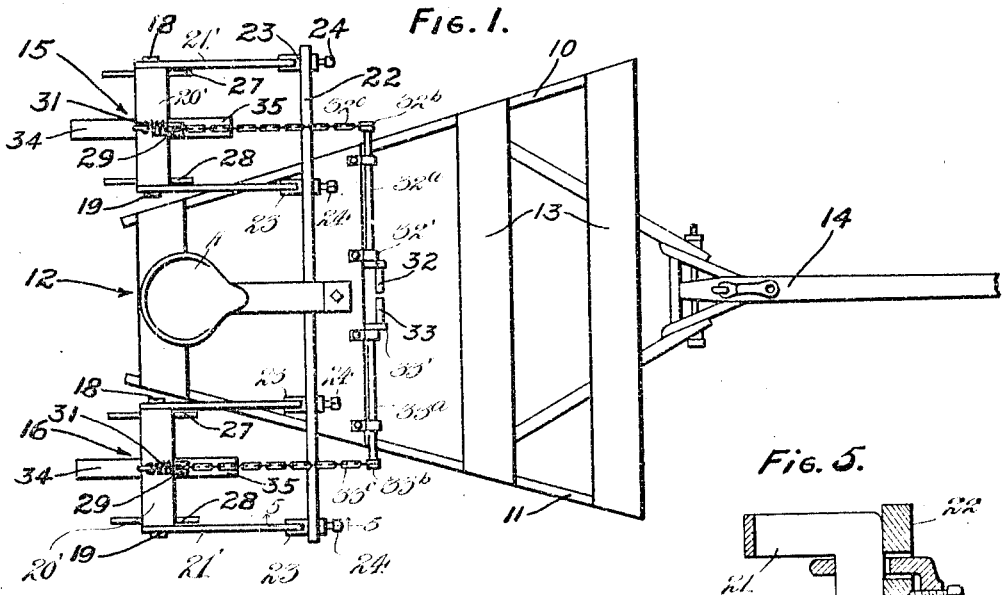
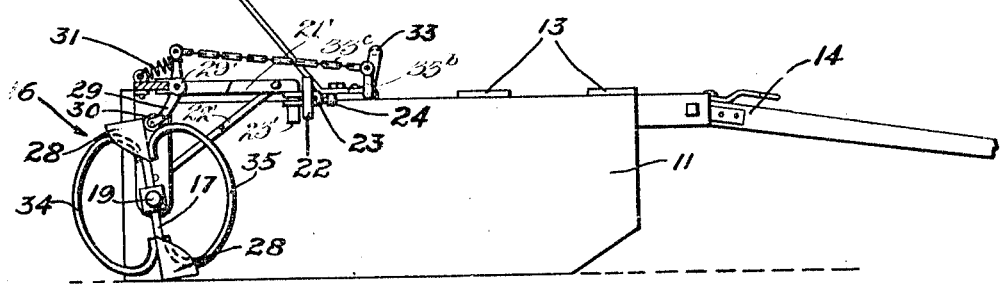
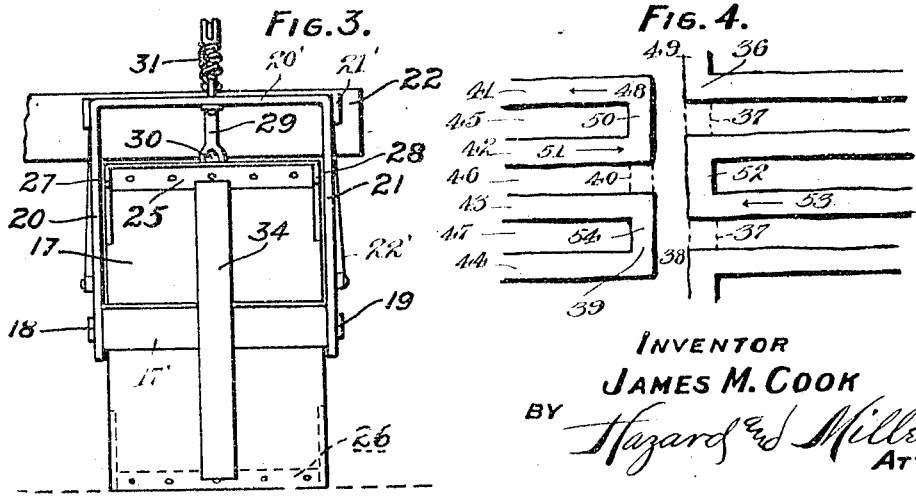

JAMES M. COOK, OF ANAHEIM, CALIFORNIA.

CORNER-FINISHER FOR IRRIGATION.

1,270,597.

Specification of Letters Patent.

Patented June 25, 1918.

Application filed October 29, 1917. Serial No. 199,088.

*To all whom it may concern:*

Be it known that I, JAMES M. COOK, a citizen of the United States, residing at Anaheim, in the county of Orange and State of California, have invented new and useful Improvements in Corner-Finishers for Irrigation, of which the following is a specification.

My object is to make a dirt scraper for use in irrigating work, and my invention consists in the novel features herein shown, described and claimed.

Figure 1 is a top plan view of an irrigation scraper embodying the principles of my invention.

Fig. 2 is a side elevation, parts being broken away and shown in section.

Fig. 3 is a rear elevation of one of the dumping scrapers, the remainder of the machine being broken away.

Fig. 4 is a diagram illustrating the operation of the machine.

Fig. 5 is a fragmentary vertical sectional detail on the line 5—5 of Fig. 1.

The scraper blades 10 and 11 are runner-shaped, mounted vertically with their rear ends spaced apart to form the throat 12 which is the width of the desired ridge to be made, and their forward ends spaced wider apart to the extent of the widths of the desired ditches to be made, and the scraper blades are rigidly connected together in this position by cross braces 13, and a draft rigging, comprising the tongue 14 and suitable hounds, is connected to the braces 13. The scraper is intended to be drawn by a pair of animals hitched to the tongue 14 and when drawn over loose ground each blade 10 and 11 will gather the dirt between their forward ends and move it inwardly, thus making two ditches and a ridge.

The dumping scrapers 15 and 16 which serve as corner finishers are mounted on opposite sides of the rear ends of the blades 10 and 11. Each dumping scraper comprises a two-ended scraper plate 17 rigidly fixed upon an axle 17', said axle extending horizontally across the center of the plate, and trunnions 18 and 19 extend from the ends of the axle. Supporting arms 20 and 21 extend downwardly from the adjustable frame bar 20', and the trunnions 18 and 19 are rotatably mounted through the lower ends of these supporting arms 20 and 21. Draw bars 21' extend forwardly from the ends of the frame bar 20' and the upper ends of the supporting arms 20 and 21, and braces 22' extend from the lower ends of the supporting arms 20 and 21 to the forward ends of the draw bars 21'. The forward ends of the draw bars 21' are bent downwardly at right angles to form the adjusting bars 23', said adjusting bars being mounted in U-clamps 23 inserted through the cross bar 22 and held by set-screws 24, so that by loosening the set screws the adjusting bars 23' may be raised or lowered, the set screws tightened, and the bars held rigidly in their adjusted positions. The cross bar 22 is rigidly mounted upon one of the braces 13 and extends both ways beyond the scraper blades 10 and 11 so that the plates 17 are substantially in the centers of the ditches formed by the scraper blades 10 and 11. The plates 17 are reinforced along their scraping ends by cutting blades 25 and 26, and side wings 27 and 28 extend forwardly from the ends of the cutting blades 25 and 26 and the side edges of the plates 17 so as to make a housing which will hold a considerable quantity of dirt. The cutting blades 25 and 26 and the wings 27 and 28 are oppositely disposed, as shown in Fig. 2, and extend forwardly at the lower ends of the blades and backwardly at the upper ends. Of course, when the plates are reversed, the same relative arrangement prevails.

Trip levers 29 are pivotally mounted in bearings 29' fixed to and extending forwardly from the frame bars 20', said levers being substantially vertical, and rollers 30 are mounted at the lower ends of the levers, said rollers being in position to bear against the forward faces of the upper edges of the plates 17 and hold the plates against rotation upon the trunnions 18 and 19, and retractile coil springs 31 connect the upper ends of the levers 29 to the frame bars 20', the tension of the springs being exerted to hold the rollers 30 in their downward positions. Foot-levers 32 and 33 are mounted upon cranks 32' and 33' fixed upon rock-shafts 32$^a$ and 33$^a$ mounted in transverse alinement in bearings fixed to one of the braces 13, and cranks 32$^b$ and 33$^b$ are fixed to the outer ends of the rock-shafts 32$^a$ and 33$^a$, and chains 32$^c$ and 33$^c$ connect the outer ends of the cranks 32$^b$ and 33$^b$ to the upper ends of the levers 29, so that when a foot-lever 32 or 33 is pushed forwardly and downwardly by the operator occupying the seat —A—, the corresponding lever 29 is operated to raise the roller 30 out of engagement with the end of the plate 17 and allow the plate to rotate by contact with the ground.

Tire bands 34 and 35 each form substantially a half a circle with their ends turned inwardly, and these in-turned ends are rigidly fixed to the ends of the plates 17 so as to make segments of a band wheel between the scraper housings, that is, from one housing to the other, so that when the housing in contact with the ground is filled with dirt to the desired extent or the dirt carried to the desired point, the foot-lever is operated to release the roller 30 from its locking position and the dirt within the housing is dumped by the forward movement of the machine and the contact between the housing and the ground. Then the bands 34 or 35 will contact with the ground and rotate the dumping scraper a half revolution to bring the other housing into operation. To stop the rotation of the dumping scraper the operator will release the corresponding foot-lever and the roller 30 travels upon the band 34 or 35 until it reaches the depression between the end of the band and the back face of the plate 17.

Referring to the diagram in Fig. 4, when it is desired to irrigate a field with my irrigation scraper, first the scraper is run up or down the field to make the ridge 36, as shown by full lines and the dotted lines 37 connecting the full lines and this operation makes a part of the ditch 38. Then the machine is run the other way with one rigid scraper plate in the ditch 38, thereby making the ridge 39, as shown by the full lines and the dotted lines 40. Then the machine is run crosswise of the field and crosswise of the ditch 38 and ridges 37 and 39 to make the ridges 41, 42, 43 and 44, and the ditches 45, 46 and 47. Now, supposing that the machine is running in the direction indicated by the arrow 48, the right-hand dumping scraper 16 will be released to dump its load of dirt to make the bank 49 in the ridge 36, and the left-hand scraper will carry the dirt from the ridge 37 across the ditch 38 and be dumped to make the bank 50 between the ridges 41 and 42 at the left-hand side of the ditch 38. Then when the scraper is going back on the ridge 42 in the direction indicated by the arrow 51, the left-hand dumping scraper will dump over the bank 50 and the right-hand scraper will carry the dirt from the ridge 39 across the ditch 38 to make the bank 52 on the opposite side of the ditch 38 from the bank 50. Then when the scraper returns in the direction indicated by the arrow 53 on the ridge 43 the right-hand dumping scraper will dump over the bank 52 and clean out the end of the ditch 46 and the left-hand dumping scraper will carry the dirt from the ridge 36 across the ditch 38 and dump it to form the bank 54.

I claim:

1. In a device of the class described, an axle, a plate fixed upon the axle, trunnions extending from the axle, a frame in which the trunnions are mounted horizontally, cutting blades upon the ends of the plate, bands connecting the ends of the plate on each side of the plate to make a wheel, wings extending from the ends of the plate in opposite directions and forming housings to gather dirt, means for holding the plate from rotating while the dirt is being gathered, and means for releasing the plate to dump the dirt.

2. In a device of the class described, a main frame, a secondary frame mounted for vertical adjustment in the main frame, an axle having trunnions rotatably mounted in the secondary frame, a plate fixed to the axle and having scraping edges, wings extending from the ends of the scraping edges and forming housings extending in opposite directions from the ends of the plate, bands connected to the ends of the plate on both sides to make a wheel, means for holding the plate in a substantially vertical position while the wheel housing is gathering dirt, and means for releasing the plate to dump the dirt.

In testimony whereof I have signed my name to this specification.

JAMES M. COOK.

Copies of this patent may be obtained for five cents each, by addressing the "Commissioner of Patents, Washington, D. C."